United States Patent
Ham et al.

(10) Patent No.: US 7,679,542 B2
(45) Date of Patent: *Mar. 16, 2010

(54) IMAGE SENSOR USING AUTO-CALIBRATED RAMP SIGNAL FOR IMPROVED IMAGE QUALITY AND DRIVING METHOD THEREOF

(75) Inventors: Seog-Heon Ham, Suwon-si (KR); Gunhee Han, Goyang-si (KR); Dong-Myung Lee, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 766 days.

This patent is subject to a terminal disclaimer.

(21) Appl. No.: 11/508,653

(22) Filed: Aug. 23, 2006

(65) Prior Publication Data

US 2007/0046802 A1   Mar. 1, 2007

(30) Foreign Application Priority Data

Aug. 23, 2005   (KR) .................. 10-2005-0077532

(51) Int. Cl.
*H03M 1/56* (2006.01)
(52) U.S. Cl. ........................... 341/169; 341/155
(58) Field of Classification Search .......... 341/118, 341/155, 167, 168, 169, 170
See application file for complete search history.

(56) References Cited

U.S. PATENT DOCUMENTS

| | | | |
|---|---|---|---|
| 5,920,274 A | 7/1999 | Gowda et al. | |
| 6,346,907 B1 | 2/2002 | Dacy et al. | 341/169 |
| 6,522,116 B1 | 2/2003 | Jordan | 323/288 |
| 6,545,624 B2 | 4/2003 | Lee et al. | |
| 6,570,904 B1 | 5/2003 | Cheng et al. | |
| 7,233,277 B2 * | 6/2007 | Roh | 341/169 |
| 7,379,011 B2 * | 5/2008 | Ham et al. | 341/170 |
| 2002/0067303 A1 | 6/2002 | Lee et al. | 341/184 |
| 2008/0303705 A1 * | 12/2008 | Sakakibara | 341/172 |

FOREIGN PATENT DOCUMENTS

KR   1020020058487   7/2002

OTHER PUBLICATIONS

Preliminary Notice of First Office Action issued by Taiwanese Patent Office dated Aug. 4, 2009 in corresponding Taiwanese Appln. No. 095130963.

* cited by examiner

*Primary Examiner*—Brian Young
(74) *Attorney, Agent, or Firm*—F. Chau & Associates, LLC

(57) ABSTRACT

An image sensor comprises an active pixel sensor (APS) array, a first analog-to-digital converter (ADC) and a ramp signal generator. The APS array includes a plurality of pixels arranged in a two-dimensional matrix, wherein the APS array generates a reset signal and an image signal for each selected column of the APS array. The first ADC includes a correlated double sampling (CDS) circuit array comprising CDS circuits that are arranged for each column of the APS array, wherein the first ADC generates a digital code from a signal corresponding to the difference between the reset signal and the image signal which are generated by the CDS circuit using a ramp signal. The ramp signal generator generates the ramp signal, wherein a second ADC receives a feedback of the generated ramp signal and generates a feedback reference code, and wherein the ramp signal generator calibrates the ramp signal based on a comparison using the feedback reference code.

21 Claims, 8 Drawing Sheets

IMAGE SENSOR USING AUTO-CALIBRATED RAMP SIGNAL FOR IMPROVED IMAGE QUALITY AND DRIVING METHOD THEREOF

CROSS-REFERENCE TO RELATED PATENT APPLICATION

This application claims priority to Korean Patent Application No. 10-2005-0077532, filed on Aug. 23, 2005, the disclosure of which is herein incorporated by reference in its entirety.

BACKGROUND OF THE INVENTION

1. Technical Field

The present disclosure relates to an image sensor and a method of driving the same and, more particularly, to a CMOS image sensor (CIS) type image sensor using a single-slope analog-to-digital converter (ADC) and a method of driving the same.

2. Discussion of Related Art

CMOS image sensors are commonly used in portable cameras, digital still cameras, web cameras and the like to convert an image into a digital signal. The digital image signal that is output from the CMOS image sensor may include various color signals. The digital image signal is processed to drive a display device such as a liquid crystal display.

The CMOS image sensor uses a correlated double sampling (CDS) method and uses a ramp signal to generate a digital signal from the difference between a reset signal and an image signal which are sampled according to the CDS method. That is, the CMOS image sensor picks up the difference between the reset signal and the image signal that varies based on external light illumination, and generates a digital code corresponding to the difference. The digital code varies depending on the slope of the ramp signal under the same illumination conditions. To maintain the same luminosity or brightness under the same illumination conditions, the ramp signal has to be constant when the image acquired by the CMOS image sensor is displayed on a display device.

An analog built-in self calibration (BISC) scheme has been conventionally used for a design for testability (DFT), and may be used to constantly supply the ramp signal that significantly affects image quality. In the conventional analog BISC scheme, the ramp signal is adaptively calibrated to coincide with an analog target voltage using an analog comparator. Variations in manufacturing processes, analog target voltages, and offsets of an amplifier used for a ramp signal calibration can be calibrated to some extent by the conventional scheme. However, the ramp signal continuously fluctuates around the target voltage due to frequency changes in a clock signal used in a ramp signal calibration, a ramp signal noise and the like, which causes deterioration of the signal-to-noise ratio (SNR) of the digital image signal output from the CMOS image sensor and limits BISC operation.

SUMMARY OF THE INVENTION

According to an exemplary embodiment of the present invention, an image sensor comprises an active pixel sensor (APS) array, a first analog-to-digital converter (ADC), and a ramp signal generator. The APS array includes a plurality of pixels arranged in a two-dimensional matrix, wherein the APS array generates a reset signal and an image signal for each selected column of the APS array. The first ADC includes a correlated double sampling (CDS) circuit array comprising CDS circuits that are arranged for each column of the APS array, wherein the first ADC generates a digital code from a signal corresponding to the difference between the reset signal and the image signal which are generated by the CDS circuit using a ramp signal. The ramp signal generator generates the ramp signal, wherein a second ADC receives a feedback of the generated ramp signal and generates a feedback reference code, and wherein the ramp signal generator calibrates the ramp signal based on a comparison using the feedback reference code.

The ramp signal generator may calibrate the feedback of the generated ramp signal in an adaptive manner with respect to colors of each of four color channels, or may calibrate the feedback of the generated ramp signal in an adaptive manner with respect to two portions of two color channels.

The ramp signal generator may comprise: a second ADC generating the feedback reference code, the feedback reference code corresponding to analog reference voltages, in response to a feedback of the generated ramp signal; a target tracking unit which compares the digital target code with the reference code, and generates an analog ramp input signal based on the comparison result; and a ramp generator generating the ramp signal in response to the ramp input signal.

According to an exemplary embodiment of the present invention, a method of driving an image sensor includes: generating a reset signal and an image signal from each pixel of selected columns in an active pixel sensor (APS) array which includes a plurality of pixels arranged in a two-dimensional matrix; generating a signal corresponding to the difference between the reset signal and the image signal using a ramp signal in a correlated double sampling (CDS) circuits arranged for each column of the APS array; generating a digital code from a signal corresponding to the difference between the reset signal and the image signal in a first analog-to-digital converter (ADC) including the CDS circuits; generating a feedback reference code that is a digital code corresponding to analog reference voltages by receiving a feedback of the ramp signal from a second ADC; and comparing a digital target code with the feedback reference code, and generating the ramp signal based on the comparison result, wherein the ramp signal is calibrated based on a comparison using the feedback reference code.

BRIEF DESCRIPTION OF THE DRAWINGS

The present invention will become readily apparent to those of ordinary skill in the art when descriptions of exemplary embodiments thereof are read with reference to the accompanying drawings.

DESCRIPTION OF EXEMPLARY EMBODIMENTS

Figure 1:
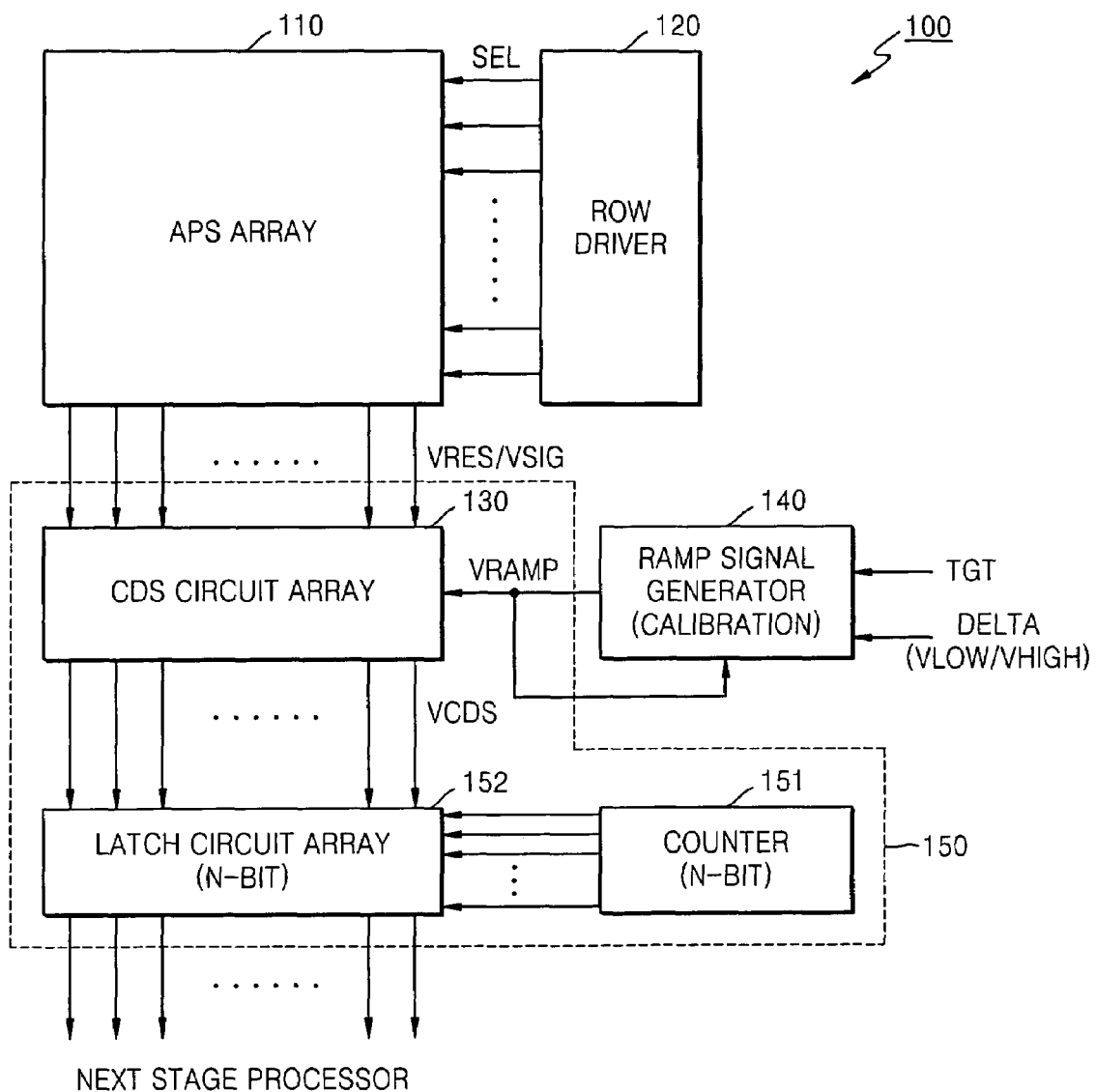
FIG. 1 shows a block diagram of an image sensor according to an exemplary embodiment of the present invention.

Hereinafter, exemplary embodiments of the present invention will be described in detail with reference to the accompanying drawings. Like reference numerals refer to similar or identical elements throughout the description of the figures.

FIG. 1 shows a CMOS image sensor 100 according to an exemplary embodiment of the present invention. Referring to FIG. 1, the image sensor 100 includes an active pixel sensor (APS) array 110, a row driver 120, a ramp signal generator 140, and a first analog-to-digital converter (ADC) 150. The first ADC 150 includes a correlated double sampling (CDS) circuit array 130, a counter 151, and a latch circuit array 152. Although not shown as such in FIG. 1, the first ADC 150 may include the ramp signal generator 140.

The row driver 120 receives a control signal from a row decoder (not shown). A column decoder (not shown) controls an output of pixel data stored in the latch circuit array 152. The image sensor 100 may include a control unit (not shown) which generates overall timing control signals for the ramp signal generator 140 and the first ADC 150 including the CDS circuit array 130.

Figure 2:
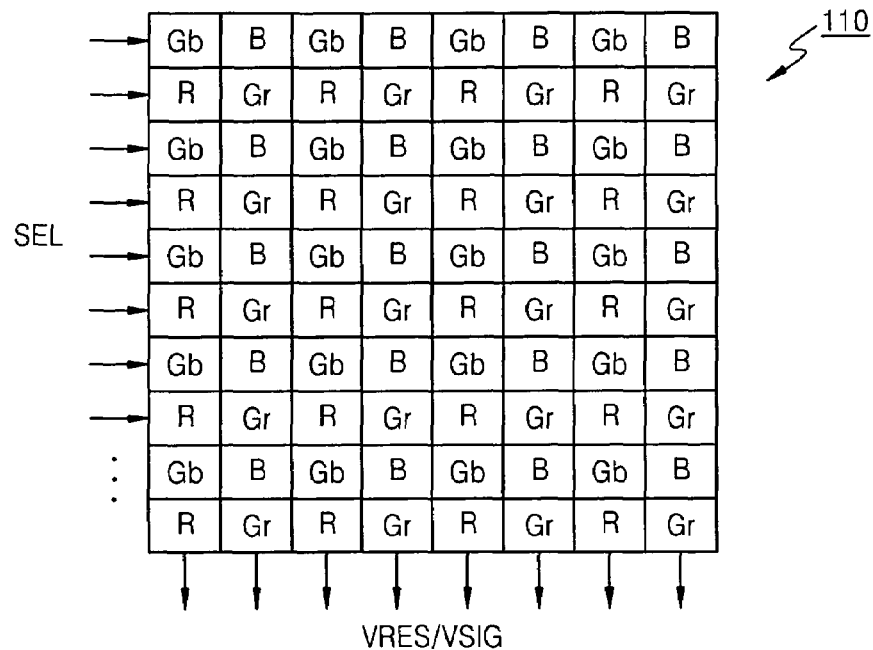
FIG. 2 shows a color filter pattern of the active pixel sensor array of FIG. 1, according to an exemplary embodiment of the present invention.

FIG. 2 shows a color filter pattern of the APS array 110 of FIG. 1, according to an exemplary embodiment of the present invention. The image sensor 100 may be a color image sensor. As shown in FIG. 2, color filters are installed on second order matrix type pixels of the APS array 110 to receive only light of predetermined colors. At least three types of color filters are used. The color filter array may be arranged in a Bayer pattern, in which two-color patterns of red R and green Gr filters and two-color patterns of green Gb and blue B filters are used in alternate columns. To enhance luminance resolution, green G (Gr and Gb) filters may be used in every column, and red R and blue B filters may be used in alternate columns.

In the image sensor 100 having the pixel structure of FIG. 2, the APS array 110 detects light using a photodiode, and converts the light to an electrical signal to create an image signal. The image signal which is output from the APS array 110 comprises red R, green Gr and Gb, and blue B analog signals. The first ADC 150 converts an analog signal which is output from the APS array 110 to a digital signal according to a CDS scheme.

Figure 3:
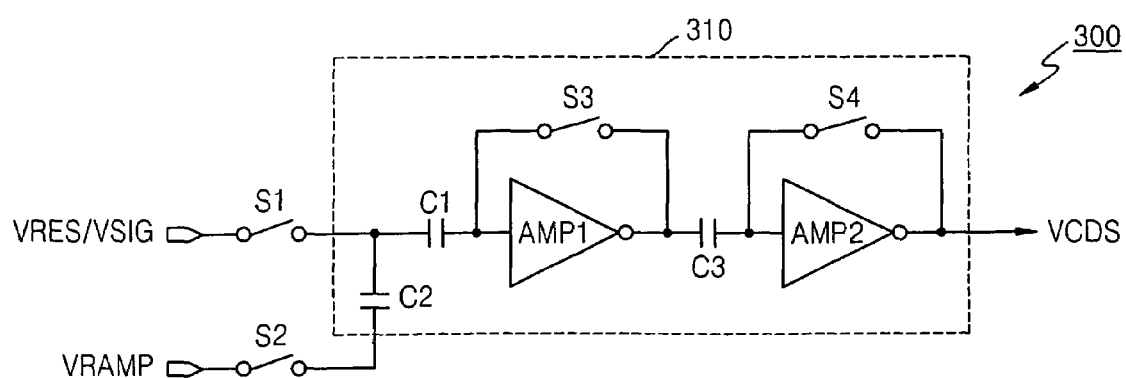
FIG. 3 shows a unit correlated double sampling (CDS) circuit for each column of the CDS circuit array of FIG. 1, according to an exemplary embodiment of the present invention.

FIG. 3 shows a unit CDS circuit 300 for each column of the CDS circuit array 130 of FIG. 1, according to an exemplary embodiment of the present invention. Referring to FIG. 3, the unit CDS circuit 300 includes switches S1 to S4, capacitors C1 to C3, a first amplifier AMP1, and a second amplifier AMP2.

The APS array 110 includes a photodiode for each pixel. From each of the pixels which are sequentially selected in response to a column selection signal SEL generated by the row driver 120, the APS array 110 outputs a reset signal VRES and an image signal VSIG that is detected by the photodiode, to a unit CDS circuit 300. The unit CDS circuit 300 generates a signal VCDS corresponding to the difference between the image signal VSIG and the reset signal VRES by using a ramp signal VRAMP. For example, when the reset signal VRES is input to the unit CDS circuit 300 from the APS array 110, the switches S1 to S4 are all turned on. When the image signal VSIG that is detected by the photodiode located in each pixel of the APS array 110 is input to the CDS circuit 300, only the switches S1 and S2 are turned on. Information of the image signal VSIG relative to the reset signal VRES is stored in the capacitors C1 and C2.

Figure 4:
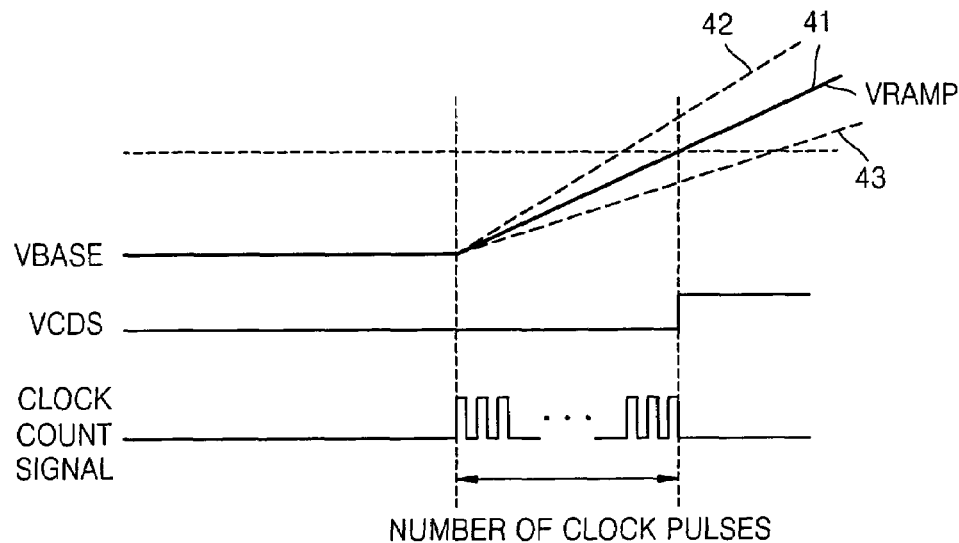
FIG. 4 shows a method of generating a digital code in an analog-to-digital converter of FIG. 1, according to an exemplary embodiment of the present invention.

FIG. 4 shows a method of generating a digital code in an analog-to-digital converter of FIG. 1, according to an exemplary embodiment of the present invention. Referring to FIG. 4, the ramp signal VRAMP is activated with the switches S1, S3, and S4 being turned off, and the switch S2 being turned on. As the ramp signal VRAMP increases in response to a comparison operation of the first amplifier AMP1, starting from when the ramp signal VRAMP is activated, the input of the first amplifier AMP1 increases due to a coupling effect of the capacitors C1 and C2. When the input of the first amplifier AMP1 becomes greater than the logic threshold voltage (VTH) of the first amplifier AMP1, an output voltage VDS of the CDS circuit 300 is triggered from a logic "low" to "high" level. The greater the difference between the reset signal VRES and the image signal VSIG generated in the APS array 110, the slower the triggering of the output signal VCDS of the CDS circuit 300.

In an exemplary embodiment of the present invention, the first ADC 150 uses a single-slope architecture. The first ADC 150 counts clock pulses starting from when the ramp signal VRAMP is activated, and uses a digital output code of the counter 151 as a reference clock count corresponding to the timing for triggering the output voltage VDS of the CDS circuit 300.

Referring to FIGS. 1 and 3, the latch circuit array 152, which is included in the first ADC 150, receives an output of the CDS circuit 300 for each column. When the ramp signal VRAMP is activated and increased, the counter 151 starts counting the number of clock pulses until the output signal VCDS of the CDS circuit array 130 is triggered from logic "low" to "high". Each column circuit of the latch circuit array 152 stores a digital count value of the counter 151. This operation is carried out for each horizontal scan period, in which the column selection signal SEL generated by the row driver 120 selects each column of the APS array 110. The digital signal stored in the latch circuit array 152 may be processed in a processor in the next stage to drive a display apparatus such as a liquid crystal display (LCD).

The ramp signal generator 140, according to an exemplary embodiment of the present invention, auto-calibrates the slope of the ramp signal VRAMP used in the CDS circuit array 130. Since the capacitance values of capacitors, resistance values of resistors and the offsets of amplifiers can vary between chips due to process variations, a digital value which is output from analog-to-digital converters may be different under the same illumination conditions, and the performance of the process in the next stage, such as an automatic white balance (AWB) and an automatic exposure (AE), may deteriorate. However, in accordance with exemplary embodiments of the present invention, the ramp signal VRAMP is supplied reliably by adapting to changes in external conditions, and an image can be displayed with optimum quality.

Figure 5:
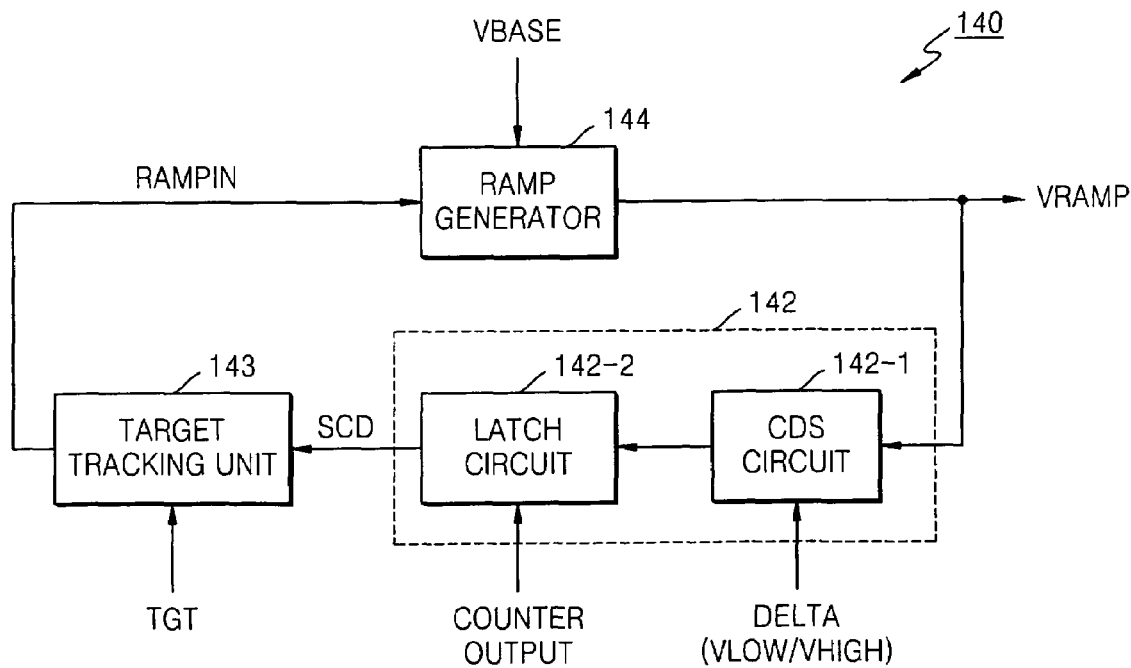
FIG. 5 is a block diagram of the ramp signal generator of FIG. 1, according to an exemplary embodiment of the present invention.

FIG. 5 is a block diagram of the ramp signal generator 140 of FIG. 1, according to an exemplary embodiment of the present invention. Referring to FIG. 5, the ramp signal generator 140 includes a second ADC 142, a target tracking unit 143, and a ramp generator 144.

The second ADC 142 includes a CDS circuit 142-1 and a latch circuit 142-2. In addition, the second ADC 142 may include a counter, such as the counter 151 of FIG. 1, to supply a count value to the latch circuit 142-2. The counter may be a common counter which can be commonly used for the first ADC 150 and the second ADC 142. In an exemplary embodiment of the present invention, the second ADC 142 uses a single-slope architecture.

The CDS circuit 142-1 may have substantially the same structure as the CDS circuit shown in FIG. 3. The latch circuit 142-2 may have substantially the same structure as the latch circuits of the latch circuit array 152 of FIG. 1. The CDS circuit 142-1 samples the analog reference voltages DELTA, or VLOW and VHIGH, and in each calibration process, the slope of the feedback ramp signal VRAMP changes until it converges on a target slope. The second ADC 142 uses the feedback ramp signal VRAMP, and stores the digital output code of the counter, e.g., common counter 151, in the latch circuit 142-2 as a feedback reference code SCD when the output voltage of the CDS circuit 142-1 is triggered, starting from when the ramp signal VRAMP is activated. The analog reference voltages VLOW and VHIGH, which are used in the CDS circuit 142-1, may be generated by a band gap reference circuit. The analog reference voltages VLOW and VHIGH may be two different voltages divided by resistors connected in series between two power sources.

The target tracking unit 143 compares a digital target code TGT and the feedback reference code SCD to generate an analog ramp input signal RAMPIN based on the comparison result. The ramp generator 144 generates the ramp signal VRAMP based on the analog ramp input signal RAMPIN. The ramp signal VRAMP is fed back to the first ADC 150 and the second ADC 142. The second ADC may be a built-in self calibration (BISC) type single-slope ADC. The digital target code TGT is input to the target tracking unit 143 from a next stage processor, such as an image signal processor (ISP). The next stage processor may carry out functions such as AE and AWB, which control a sensor gain for optimum image quality. The signal-to-noise ratio (SNR) can be improved by controlling the analog gain of an image sensor. In an image sensor including the first ADC 150 described in connection with FIG. 1, according to an exemplary embodiment of the present invention, the digital target code TGT is input from the next stage processor to control the analog gain by controlling the slope of the ramp signal VRAMP.

Figure 6:
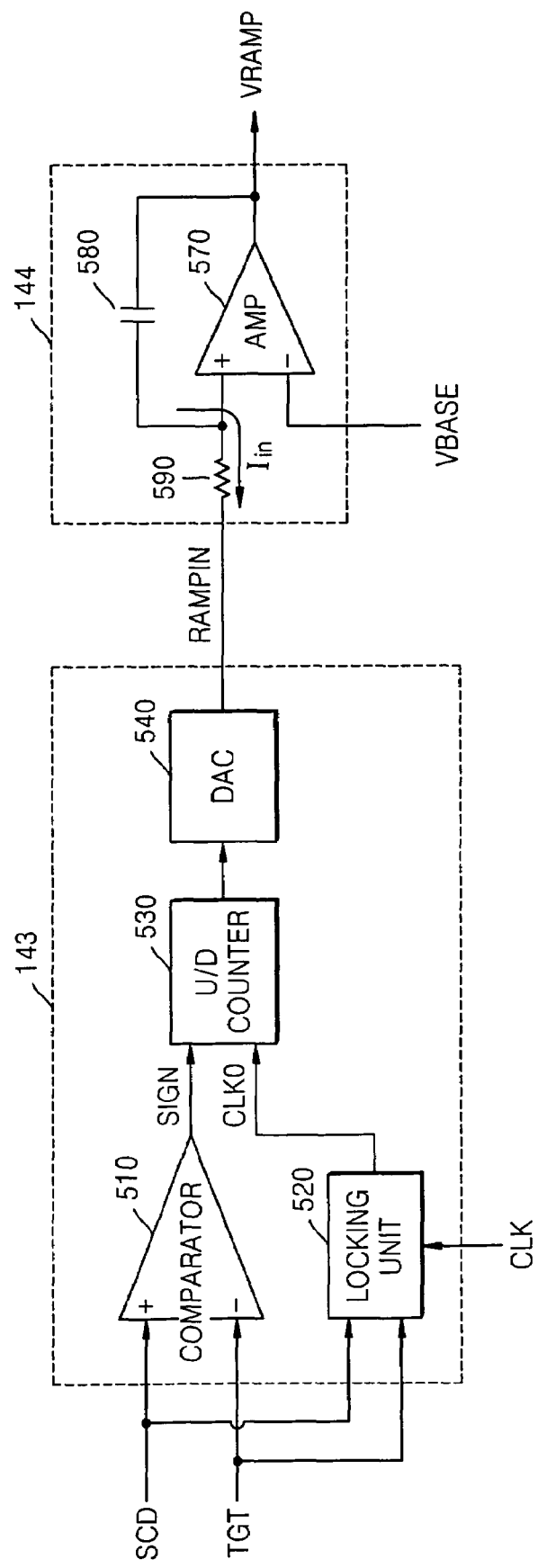
FIG. 6 is a block diagram of a target tracking unit and a ramp generator of FIG. 5, according to an exemplary embodiment of the present invention.

FIG. 6 is a block diagram of the target tracking unit 143 and the ramp generator 144 of FIG. 5, according to an exemplary embodiment of the present invention. Referring to FIG. 6, the target tracking unit 143 includes a comparator 510, a locking unit 520, an up/down (U/D) counter 530, and a digital-to-analog converter (DAC) 540. The ramp generator 144 includes a switch 560, an amplifier 570, a capacitor 580, and a resistor 590.

The comparator 510 generates a sign signal SIGN indicative of which value is greater as between the digital target code TGT that is input from the next stage processor and the feedback reference code SCD that is generated by the second ADC 142. The locking unit 520 compares the digital target code TGT and the reference code SCD, and disables or enables an input clock signal CLK to be output, based on the comparison result. The locking unit 520 will be described later in this disclosure with reference to FIG. 7.

The U/D counter 530 of FIG. 6 is synchronized with an enabled clock signal CLK0 output from the locking unit 520, and counts up or down in response to the sign signal SIGN. When the clock signal CLK0 output from the locking unit 520 is disabled, the U/D counter 530 maintains the previous state. In an exemplary embodiment of the present invention, when the sign signal SIGN is logic high, the U/D counter 530 controls the DAC 540 to increase an integral current $I_{in}$ of the ramp generator 144 performing an integral function, and when the sign signal SIGN is logic low, the U/D counter 530 controls the DAC 540 to decrease the integral current $I_{in}$. It can be determined whether to use up counting or down counting based on the sign signal SIGN according to the structure of the DAC 540 and a base analog voltage VBASE of the ramp generator 144. The DAC 540 converts a count value of the U/D counter 530 into an analog signal, generates the ramp input signal RAMPIN using the converted signal, and supplies the generated signal to the ramp generator 144.

In the ramp generator 144, the amplifier 570 operates in response to an input of the base analog voltage VBASE and the ramp input signal RAMPIN to output the ramp signal VRAMP. The ramp input signal RAMPIN generates the integral current $I_{in}$ through the resistor 590. The switch 560 and the capacitor 580 are electrically connected between input and output nodes of the amplifier 570. The switch 560 controls an enable time of the ramp signal VRAMP whenever the logic level is low. According to the digital target code TGT input from the next stage processor, the slope of the ramp signal VRAMP of the ramp signal generator 140 changes, which results in a variation of the analog gain for the first ADC 150 of FIG. 1. For example, when the integral current $I_{in}$ of the ramp generator 144 increases, the slope of the ramp signal VRAMP increases as indicated by the dashed line 42 of FIG. 4, thereby reducing the gain of the first ADC 150. On the other hand, when the integral current $I_{in}$ decreases, the slope of the ramp signal VRAMP decreases as indicated by the dashed line 43 of FIG. 4, thereby increasing the gain of the first ADC 150.

Figure 7:
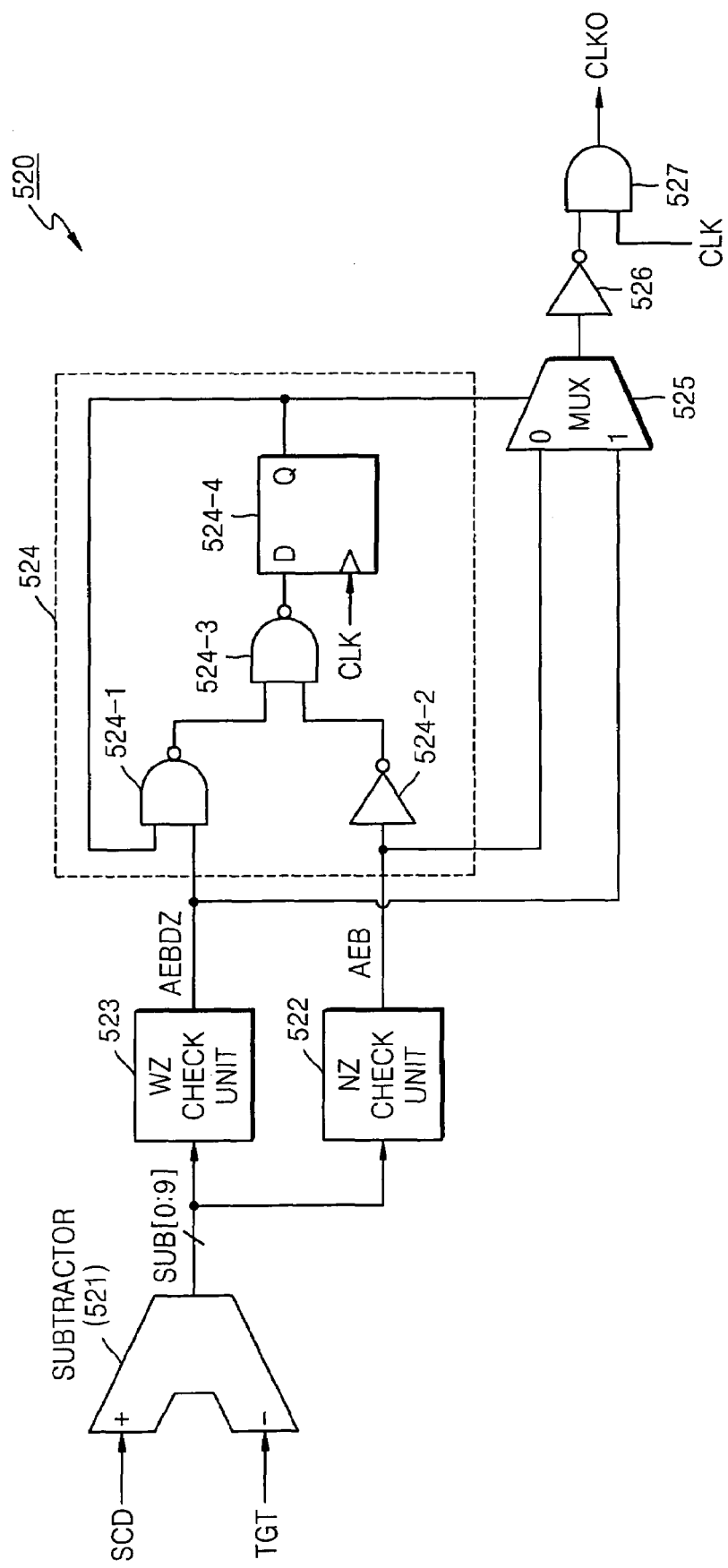
FIG. 7 is a block diagram of a locking unit of FIG. 6, according to an exemplary embodiment of the present invention.

FIG. 7 is a block diagram of an example of the locking unit 520 of FIG. 6, according to an exemplary embodiment of the present invention. Referring to FIG. 7, the locking unit 520 includes a subtractor 521, an NZ check unit 522, a WZ check unit 523, a state control unit 524, a multiplexer 525, an inverter 526, and an AND logic gate 527.

Figure 8:
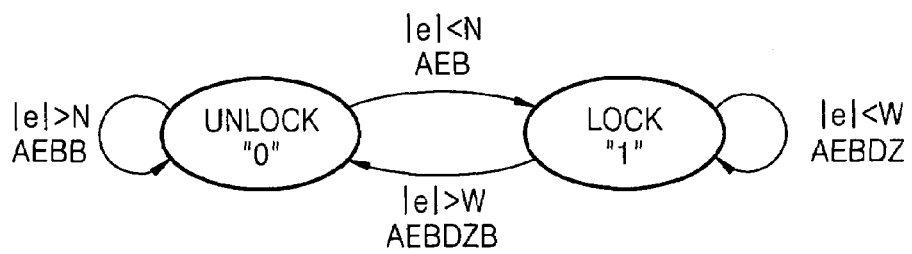
FIG. 8 is a state diagram illustrating operations of a locking unit of FIG. 7, according to an exemplary embodiment of the present invention.

The subtractor 521 subtracts the digital target code TGT from the reference code SCD. The NZ check unit 522 generates a signal AEB which is selectively activated according to whether the subtraction result SUB[0:9] exists in NZ. For example, if the subtraction result SUB[0:9] exists in NZ, as shown in FIG. 8, the output signal AEB of the NZ check unit 522 is logic high (1), and otherwise, the output signal AEB of the NZ check unit 522 is logic low (0).

The WZ check unit 523 generates a signal AEBDZ which is selectively activated according to whether the subtraction result SUB[0:9] exists in WZ. For example, if the subtraction result SUB[0:9] exists in WZ, as shown in FIG. 8, the output signal AEBDZ of the WZ check unit 523 is logic high (1), and, otherwise, the output signal AEBDZ of the WZ check unit 523 is logic low (0).

The state control unit 524 generates a state control signal based on the output signal AEB of the check unit 522 and the output signal AEBDZ of the WZ check unit 523. The multiplexer 525 selectively outputs either the output signal AEB of the check unit 522 or the output signal AEBDZ of the WZ check unit 523, based on the state control signal. The inverter 526 inverts the output of the multiplexer 525. The AND logic 527 outputs the result CLK0 of an AND operation on the output of the inverter 526 and the input clock signal CLK. The AND logic gate 527 outputs the disabled clock signal or the enabled clock signal based on the output of the inverter 526.

As shown in FIG. 7, the state control unit 524 includes a first NAND logic gate 524-1, a second inverter 524-2, a second NAND logic gate 524-3, and a flop-flop 524-4.

The first NAND logic gate 524-1 outputs a result of an NAND operation between the WZ check unit 523 and the state control signal that is to be fed back. The second inverter 524-2 inverts the output of the check unit 522. The second NAND logic gate 524-3 outputs the result of a NAND operation on the first NAND logic gate 524-1 and the second inverter 524-2. The flip-flop 524-4 outputs the output of the second NAND logic gate 524-3 as the state control signal, in synchronization with the input clock signal CLK.

Operations of the state control unit 524 are summarized in table 1.

TABLE 1

| transition condition | | current | | |
|---|---|---|---|---|
| AEB | AEBDZ | state | next state | state transition |
| 0 | 0 | 0 | 0 | unlock→unlock |
| 0 | 0 | 1 | 0 | lock→unlock |
| 0 | 1 | 0 | 0 | unlock→unlock |
| 0 | 1 | 1 | 1 | lock→lock |
| 1 | 0 | 0 | X | don't care |
| 1 | 0 | 1 | X | don't dare |
| 1 | 1 | 0 | 1 | unlock→lock |
| 1 | 1 | 1 | 1 | lock→lock |

Referring to FIG. 8 and table 1, if AEB is "0", AEBDZ is "0", and the current state is "0" (unlock), the subtraction result SUB[0:9] of the subtractor 521 exists out of WZ, and the next state is also "0" (unlock). If AEB is "0", AEBDZ is "0", and the current state is "1" (lock), the subtraction result SUB[0:9] of the subtractor 521 exists out of WZ, and the next state changes to "0" (unlock). If AEB is "0", AEBDZ is "1", and the current state is "0" (unlock), the subtraction result SUB[0:9] of the subtractor 521 exists between NZ and WZ and is close to NZ, and the next state maintains "0" (unlock). If AEB is "0", AEBDZ is "1", and the current state is "1" (lock), the subtraction result SUB[0:9] of the subtractor 521 exits in WZ, and the next state maintains "1" (lock). If AEB is "1", AEBDZ is "1", and the current state is "0" (unlock), the subtraction result SUB[0:9] of the subtractor 521 exists in NZ, and the next state changes to "1" (lock). If AEB is "1", AEBDZ is "1", and the current state is "1" (lock), the subtraction result SUB[0:9] of the subtractor 521 continuously exists in NZ, which is an ideal operation state, and the next state maintains "1" (lock). In FIG. 8, AEBB is an inversion of AEB, and AEBDZB is an inversion of AEBDZ.

Figure 9:
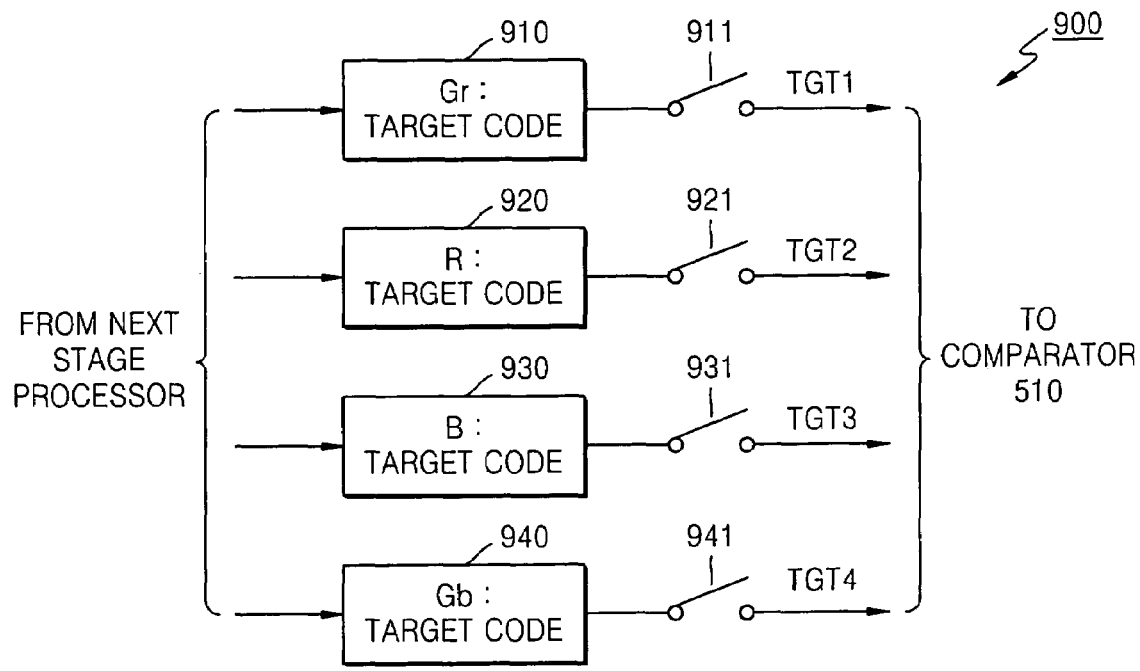
FIG. 9 shows a circuit in which target codes to be output to the comparator 510 of FIG. 6 are separately input to four channels according to an exemplary embodiment of the present invention.
Figure 10:
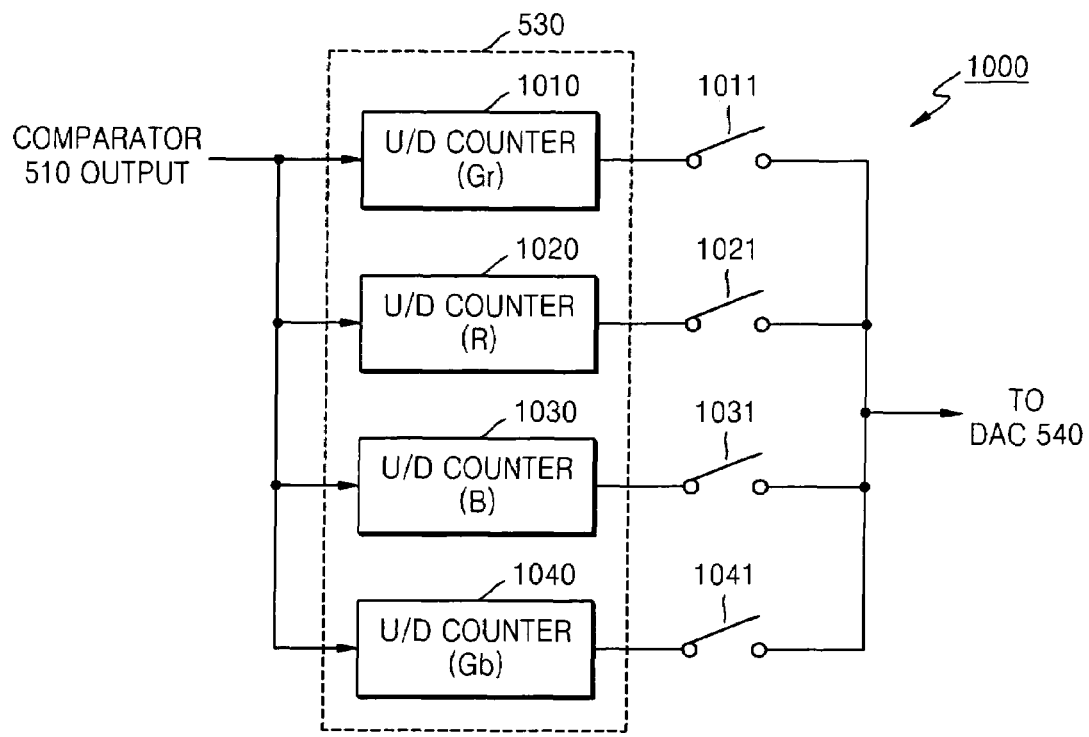
FIG. 10 shows a circuit for dividing an output of the up/down (U/D) counter 530 of FIG. 6, into four channels, according to an exemplary embodiment of the present invention.

FIG. 9 shows a circuit 900 in which target codes to be output to the comparator 510 of FIG. 6 are separately input to four channels according to an exemplary embodiment of the present invention. FIG. 10 shows a circuit 1000 for dividing an output of the U/D counter 530 of FIG. 6, such that the output can be separately input to four channels according to an exemplary embodiment of the present invention. The ramp signal generator 140 can calibrate the ramp signal VRAMP in an adaptive manner with respect to each color of four color channels.

The circuit 900 can receive different target codes 910 to 940 of Gr, R, B, and Gb for the four color channels from the next stage processor, and switches the switches 911 to 941 in response to signals (not shown) output to the comparator 510. Target codes TGT1 to TGT4 passing through the switches 911 to 941 are compared with the feedback reference code SCD in the comparator 510. The U/D counter 530 as indicated by the dashed box in FIG. 10 is configured as four U/D counters 1010, 1020, 1030, and 1040, which perform up/down counting for each channel respectively in response to the sign signal SIGN output from the comparator 510, in synchronization with the enabled clock signal CLK0 that is output from the locking unit 520 at different times.

Digital codes of the U/D counters 1010, 1020, 1030, and 1040 for each channel are output to the DAC 540 of FIG. 6, while the switches 1011 to 1041 are switched in response to control signals (not shown). The DAC 540 converts an output digital count value into an analog signal, and supplies the converted signal to the ramp generator 144 by generating the ramp input signal RAMPIN at different times. A channel grouping control method will be described with reference to FIGS. 11 and 12.

Figure 11:
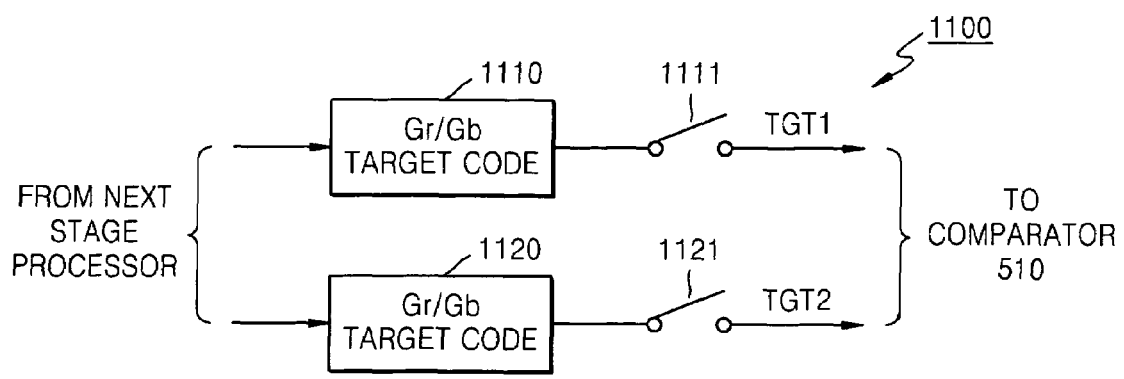
FIG. 11 shows a circuit in which target codes to be output to the comparator 510 of FIG. 6 are separately input to two channels according to an exemplary embodiment of the present invention.
Figure 12:
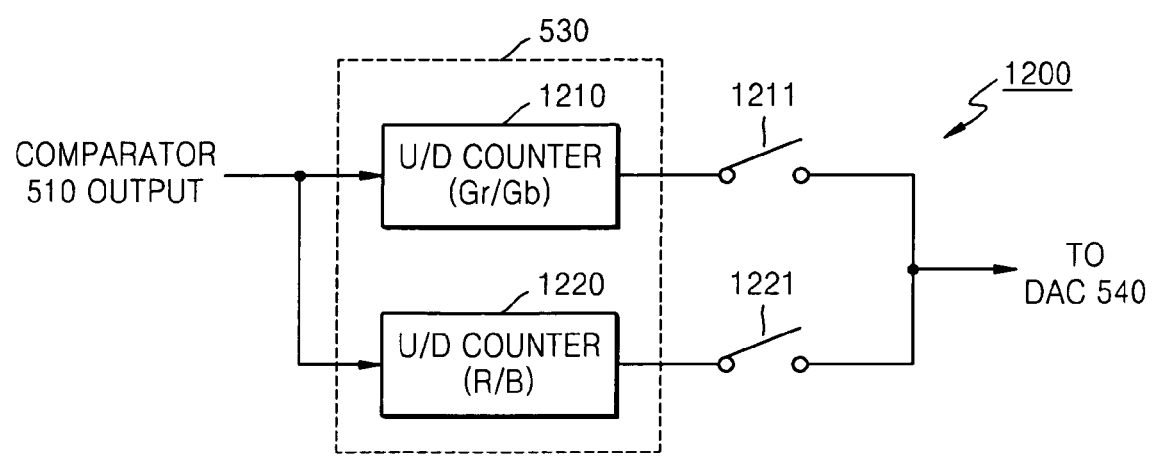
FIG. 12 shows a circuit for dividing an output of the U/D counter 530 of FIG. 6, such that the output can be separately input to two channels, according to an exemplary embodiment of the present invention.

FIG. 11 shows a circuit 1100 in which target codes to be output to the comparator 510 of FIG. 6 are separately input to two channels, according to an exemplary embodiment of the present invention. FIG. 12 shows a circuit 1200 for dividing an output of the U/D counter 530 of FIG. 6, such that the output can be separately input to two channels according to an exemplary embodiment of the present invention. The ramp signal generator 140 can feed back the ramp signal VRAMP which is adaptively calibrated with respect to two portions of the two-color channels; for example, a first portion comprising the colors Gr and Gb and a second portion comprising the colors R and B.

The circuit 1100 can receive different target codes 1110 to 1120 of Gr/Gr and R/B for the two-color channels from the next stage processor, and switches the switches 1111 to 1121 in response to signals (not shown) to output to the comparator 510 of FIG. 6. Target codes TGT1 and TGT2 passing through the switches 1111 to 1121 are compared with the feedback reference code SCD in the comparator 510. The U/D counter 530 as indicated by the dashed box in FIG. 12 is configured as two U/D counters 1210 and 1220, which perform up/down counting for each channel respectively in response to the sign signal SIGN output from the comparator 510, in synchronization with the enabled clock signal CLK0 that is output from the locking unit 520 at different times.

Digital codes of the U/D counters 1210 and 1220 for each channel are output to the DAC 540 of FIG. 6, while the switches 1211 to 1221 are switched in response to control signals (not shown). The DAC 540 converts an output digital count value into an analog signal, and supplies the converted signal to the ramp generator 144 by generating the ramp input signal RAMPIN at different times.

As described above, in the image sensor 100 according to an exemplary embodiment of the present invention, the ramp signal generator 140 compares the digital target code TGT with the reference code SCD, generates the ramp signal VRAMP based on the comparison result, and feeds back the ramp signal VRAMP to the CDS circuit array 130 in the first ADC 150, and the second ADC 142 in the ramp signal generator 140. In an exemplary embodiment of the present invention, the ramp signal VRAMP is continuously calibrated such that the digital feedback reference code SCD corresponding to the reference analog voltages VLOW and VHIGH can coincide with the digital target code TGT input from the next stage processor. The ramp signal VRAMP may be adaptively calibrated for each color based on analog gains which are respectively controlled for four color channels or two color channels.

In an image sensor according to an exemplary embodiment of the present invention, a ramp signal is auto-calibrated by adapting for changes in external conditions, and an image signal can be output at a constant brightness any time under the same illumination conditions. In an image sensor according to an exemplary embodiment of the present invention, an analog gain is used instead of a digital gain, and the SNR is improved. In an image sensor according to an exemplary embodiment of the present invention, programming for AE, AWB, and flicker removal can be optimized due to the correct gain control for each channel.

Although the exemplary embodiments of embodiments of the present invention have been described in detail with reference to the accompanying drawings for the purpose of illustration, it is to be understood that the inventive processes and apparatus should not be construed as limited thereby. It will be readily apparent to those of reasonable skill in the art that various modifications to the foregoing exemplary embodiments may be made without departing from the scope of the invention as defined by the appended claims, with equivalents of the claims to be included therein.

What is claimed is:

1. An image sensor comprising:
    an active pixel sensor (APS) array including a plurality of pixels arranged in a two-dimensional matrix, wherein the APS array generates a reset signal and an image signal for each selected column of the APS array;
    a first analog-to-digital converter (ADC) including a correlated double sampling (CDS) circuit array comprising CDS circuits arranged for each column of the APS array, wherein the first ADC generates a digital code from a signal corresponding to a difference between the reset signal and the image signal which are generated by the CDS circuit using a ramp signal; and
    a ramp signal generator which generates the ramp signal, wherein a second ADC receives a feedback of the generated ramp signal and generates a feedback reference code, and wherein the ramp signal generator calibrates the ramp signal based on a comparison using the feedback reference code.

2. The image sensor of claim 1, wherein the APS array is arranged in a Bayer pattern.

3. The image sensor of claim 2, wherein the ramp signal generator calibrates the feedback of the generated ramp signal in an adaptive manner with respect to colors of each of four color channels.

4. The image sensor of claim 2, wherein the ramp signal generator calibrates the feedback of the generated ramp signal in an adaptive manner with respect to a first portion and a second portion of two color channels.

5. The image sensor of claim 4, wherein the first portion comprises Gr and Gb colors and the second portion comprises R and B colors.

6. The image sensor of claim 1, wherein the ramp signal generator comprises:
    a second ADC generating the feedback reference code, the feedback reference code corresponding to analog reference voltages, in response to a feedback of the generated ramp signal;
    a target tracking unit which compares the digital target code with the feedback reference code and generates an analog ramp input signal based on the comparison result; and
    a ramp generator generating the ramp signal in response to the analog ramp input signal.

7. The image sensor of claim 6, wherein two of the analog reference voltages are generated between resistors of a band gap reference circuit comprising resistors connected in series between two power sources.

8. The image sensor of claim 7, wherein the target tracking unit comprises:
    a comparator generating a sign signal indicative of which value is greater as between the digital target code and the reference code;
    a locking unit which compares the digital target code with the reference code and either disables or enables an input clock signal based on the comparison result;
    a counter performing up/down counting in response to the sign signal, in synchronization with an enabled clock signal that is output from the locking unit; and
    a digital-to-analog converter (DAC) which converts a count value into an analog signal and generates the converted signal as the ramp input signal.

9. The image sensor of claim 8, wherein the locking unit has a hysteresis function in which, when the comparison result exists in either a first area or a second area including the first area, the disabled clock signal is output, and when the comparison result does not exist in the first area or the second area, the enabled clock signal is output.

10. The image sensor of claim 8, wherein the locking unit comprises:
    a subtractor subtracting the digital target code from the reference code;
    a first area check unit generating a signal that is selectively activated according to whether the subtraction result exists in the first area;
    a second area check unit generating a signal that is selectively activated according to whether the subtraction result exists in the second area including the first area; and
    a state control unit generating a state control signal based on outputs of the first area check unit and the second area check unit,
    wherein the input clock signal is disabled or enabled in response to the state control signal.

11. The image sensor of claim 8, wherein the locking unit comprises:
    a subtractor subtracting the digital target code from the reference code;
    a comparator performing a comparison by selecting the first area or the second area in response to the subtraction result; and
    a feedback unit which receives a feedback of the previous comparison result, and determines whether the comparison result is compared with the first area or the second area,
    wherein the input clock signal is either disabled or enabled based on the comparison result.

12. A method of driving an image sensor, comprising:
    generating a reset signal and an image signal from each pixel of selected columns in an active pixel sensor (APS) array including a plurality of pixels arranged in a two-dimensional matrix;
    generating a signal corresponding to a difference between the reset signal and the image signal using a ramp signal in correlated double sampling (CDS) circuits arranged for each column of the APS array;

generating a digital code from a signal corresponding to the difference between the reset signal and the image signal in a first analog-to-digital converter (ADC) including the CDS circuits;

generating a feedback reference code that is a digital code corresponding to analog reference voltages by receiving a feedback of the ramp signal from a second ADC; and comparing a digital target code with the feedback reference code and generating the ramp signal based on the comparison result, wherein the ramp signal is calibrated based on a comparison using the feedback reference code.

13. The method of claim 12, wherein the APS array is arranged in a Bayer pattern.

14. The method of claim 13, wherein the feedback of the generated ramp signal is calibrated in an adaptive manner with respect to colors of four color channels based on the digital target code and the feedback reference code.

15. The method of claim 13, wherein the feedback of the generated ramp signal is calibrated in an adaptive manner with respect to a first portion and a second portion of two color channels on the digital target code and the reference code.

16. The method of claim 15, wherein the first portion comprises Gr and Gb colors and the second portion comprises R and B colors.

17. The method of claim 12, further comprising:
comparing a digital target code with the reference code and generating an analog ramp input signal based on the comparison result, and
generating the ramp signal using an amplifier in response to the ramp input signal.

18. The method of claim 17, further comprising:
generating a sign signal that is indicative of which value is greater as between the digital target code and the reference code;
comparing the digital target code with the reference code and either disabling or enabling an input clock signal based on the comparison result;
performing up/down counting in response to the sign signal, in synchronization with an enabled clock signal; and
converting a count value into an analog signal and generating the converted signal as the ramp input signal.

19. The method of claim 18, wherein when the comparison result exists in either a first area or a second area including the first area, the disabled clock signal is output, and when the comparison result does not exist in the first area or the second area, the enabled clock signal is output.

20. The method of claim 18, further comprising:
subtracting the digital target code from the reference code;
generating a first signal that is selectively activated according to whether the subtraction result exists in the first area;
generating a second signal that is selectively activated according to whether the subtraction result exists in the second area including the first area; and
generating a state control signal based on the first signal and the second signal, and
selectively outputting any one of the first signal and the second signal in response to the state control signal.

21. The method of claim 18, further comprising:
subtracting the digital target code from the reference code;
performing a comparison by selecting the first area or the second area in response to the subtraction result; and
receiving a feedback of the previous comparison result and determining whether the comparison result is compared with the first area or the second area,
wherein the input clock signal is either disabled or enabled based on the comparison result.

* * * * *